Nov. 30, 1954     S. G. TILDEN     2,695,649
DEVICE FOR CLAMPING FRICTION MATERIAL
ELEMENTS IN PLACE ON A BRAKE
SHOE OF AUTOMOTIVE VEHICLES
Filed June 4, 1951     3 Sheets-Sheet 1
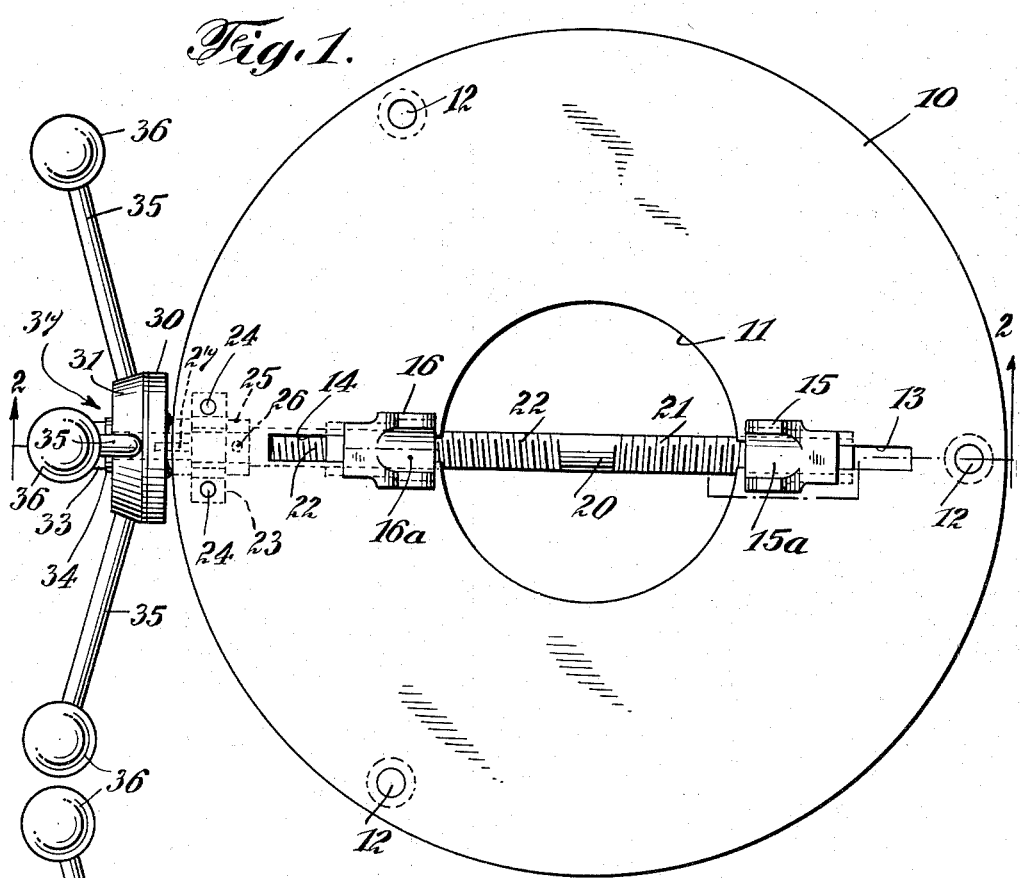
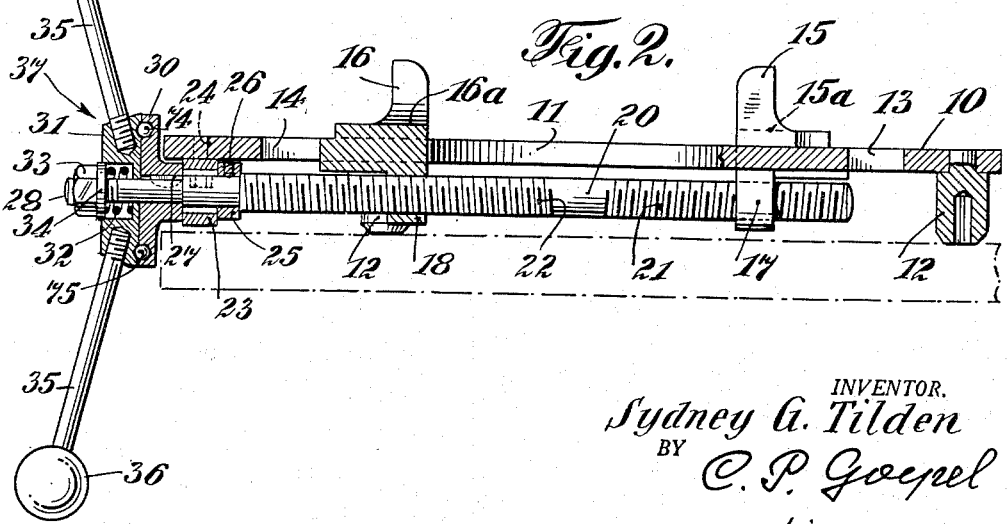
INVENTOR.
Sydney G. Tilden
BY C. P. Goepel
his ATTORNEY Nov. 30, 1954 S. G. TILDEN 2,695,649
DEVICE FOR CLAMPING FRICTION MATERIAL
ELEMENTS IN PLACE ON A BRAKE
SHOE OF AUTOMOTIVE VEHICLES
Filed June 4, 1951 3 Sheets-Sheet 2
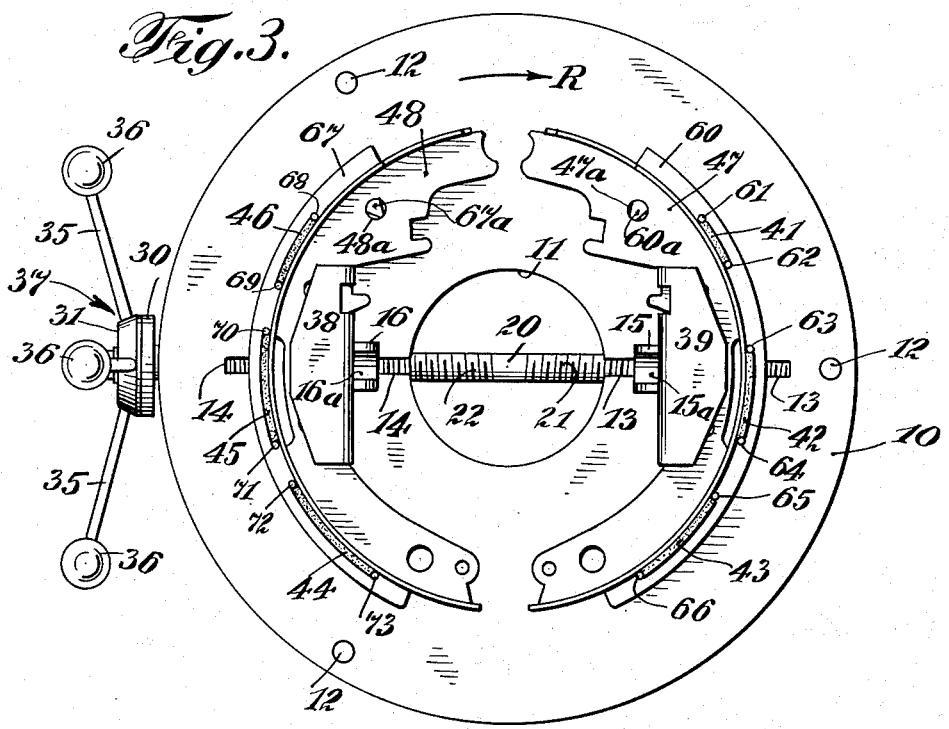
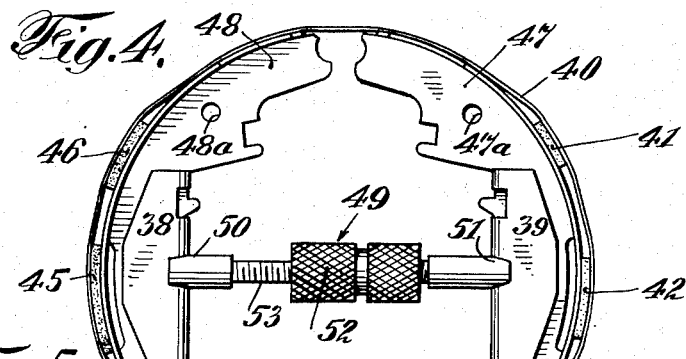
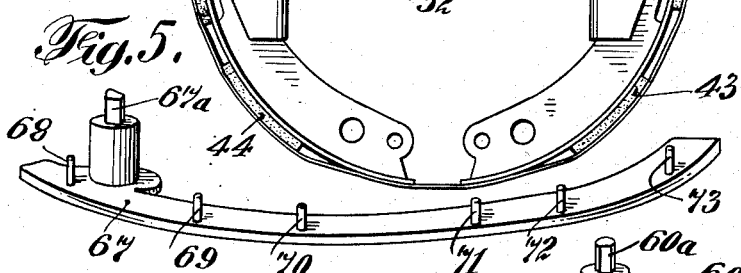
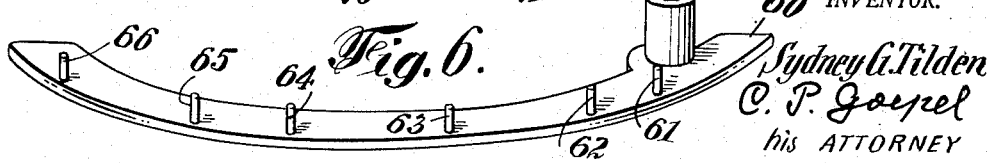
INVENTOR.
Sydney G. Tilden
C. P. Goepel
his ATTORNEY Nov. 30, 1954　　　　S. G. TILDEN　　　　2,695,649
DEVICE FOR CLAMPING FRICTION MATERIAL
ELEMENTS IN PLACE ON A BRAKE
SHOE OF AUTOMOTIVE VEHICLES
Filed June 4, 1951　　　　　　　　　　　3 Sheets-Sheet 3
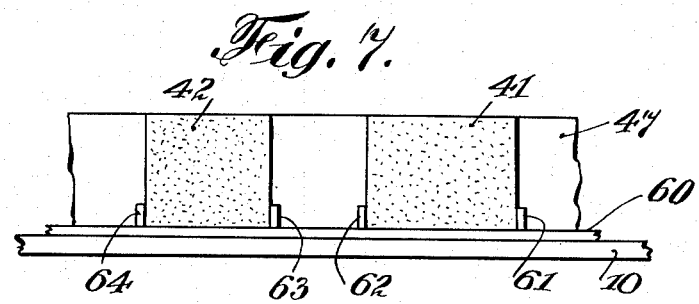
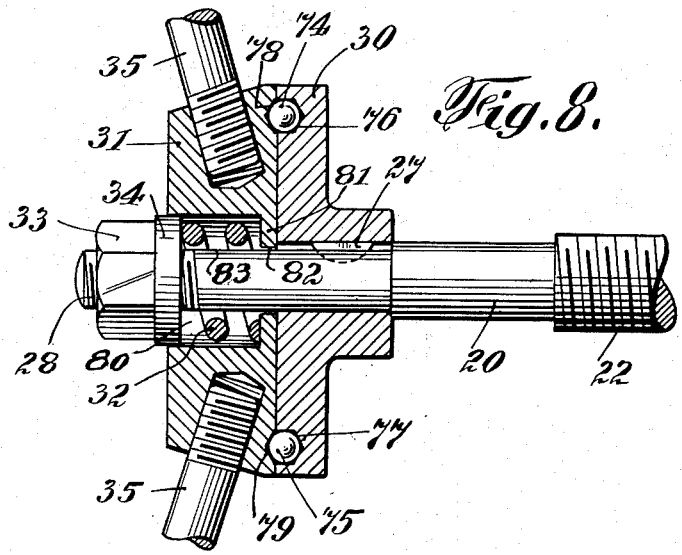
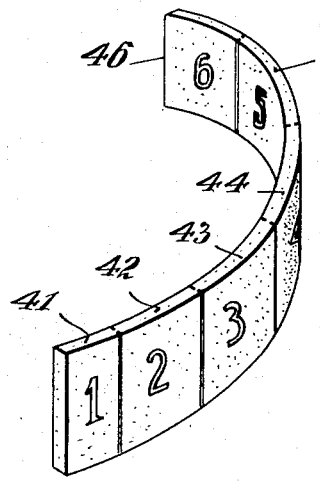
INVENTOR.
Sydney G. Tilden
BY
C. P. Goepel
his ATTORNEY United States Patent Office 2,695,649
Patented Nov. 30, 1954

2,695,649

DEVICE FOR CLAMPING FRICTION MATERIAL ELEMENTS IN PLACE ON A BRAKE SHOE OF AUTOMOTIVE VEHICLES

Sydney G. Tilden, Stewart Manor, N. Y., assignor to The Permafuse Corp., Garden City, N. Y., a corporation of New York Application June 4, 1951, Serial No. 229,843

3 Claims. (Cl. 154—1)

This invention relates to brake shoes having segments of friction material bonded to the brake shoe. The invention includes a device having means for holding each segment in position against the brake shoe during the cure of the adhesive, and means for holding the segments in place on the brake shoe under pressure before subjecting the brake shoe to heat including means for limiting the pressure applied.

It is known to have an internal expanding type brake, now almost universally used on automotive vehicles, employ two semi-rigid brake shoes having exterior arcuate surfaces to each of which is attached a single friction material facing. In use, the shoes are forced outwardly against a brake drum by the actuating means, usually a double-ended hydraulic slave cylinder having pistons which are connected to the shoes by means of push rods. While shuch brake design has generally employed a plurality of rivets to hold in place the single friction material facing, a rather recent development of adhesives having sufficient strength, flexibility and heat resistance to withstand the conditions of stress, strain and temperature encountered in brake service, has permitted the widespread adoption of bonding the friction material facing directly to the surface of the brake shoe under controlled heat and pressure.

In bonding such a friction material facing to a brake shoe, the faying surfaces, with the adhesive agent interposed, must be held together under pressure while heat is applied. The various adhesive agents available require various curing pressures for maximum bond strength and the optimum pressure for any particular adhesive selected must be first determined and then that pressure applied during the bonding cycle. If the pressure applied is too low, intimate contact between the faying surfaces will not be achieved, and will result in a bond of subnormal strength. If the pressure applied is too high, much of the adhesive agent will be squeezed out before being cured, which will likewise result in a bond of subnormal strength. Thus some means of controlling the pressure applied between the brake shoe and the friction material facing to be bonded to it, must be incorporated in the clamping device employed.

It has been proposed that the operation and efficiency of a brake such as described above can be improved if the single friction material facing, running the entire length of each brake shoe, is replaced by a plurality of short individual elements separated by intervening spaces. Although this construction materially reduces the total area of friction material in contact with the brake drum, friction material wear is actually reduced because the intervening spaces permit radiation of heat from the brake drum internally and result in a cooler running brake. Furthermore, the plurality of element ends, wiping the brake drum surface as it rotates over the elements, keep dirt and grit from entering between the friction material surface and the brake drum and prevent scoring. The use of short elements, with intervening spaces between, reduces the rigidity of the lined brake shoe assembly and permits greater flexing of the brake shoe so that it may conform to the brake drum as the drum becomes distorted by the brake shoe forces.

However, when a plurality of short friction material elements are employed, the problem of properly positioning each individual element on a brake shoe is presented, and to utilize this new departure of the use of individual elements, these elements must be accurately positioned on each brake shoe so that corresponding shoes employed in the brakes on the four wheels of a vehicle, will be synchronously disposed and the braking action balanced.

The invention includes means of locating each individual friction material element in its proper position on each brake shoe and incorporating such means in the clamping device employed for application of the elements to the brake shoe.

The present invention consists of an assembly device for clamping friction material elements in place on a brake shoe, with an adhesive agent interposed, under controlled pressure, including a device to locate each element in its correct position on the brake shoe.

In the improved assembly device, a horizontal base plate to support a pair of brake shoes resting on edge with friction material elements in place on the exterior arcuate surfaces of the shoes is employed, and a flexible band encircles and constrains the shoes, expanding jaws act to force the shoes with such elements radially outward against said encircling and constraining flexible band, a screw shaft expands the jaws radially outward, a hand wheel rotates the screw shaft, and a torque limiting device incorporated in the hand wheel limits the expanding force of the jaws to a predetermined and selected amount. In the event individual and separated friction material segments are to be bonded, jigs, interposed between the brake shoes and the base plate, having small pins extending between the band and the brake shoes to locate and position each of a plurality of individual and separated friction material elements in their correct positions on the exterior arcuate surfaces of the brake shoes, are used. Each locating jig has a pivot lug designed to engage a reference hole in the brake shoe which locates the jig with respect to the brake shoe, and a plurality of the aforesaid small pins, of a diameter less than the thickness of the friction material element, aligned in an arc and tangent to the exterior arcuate surface of the brake shoe and spaced apart so as to form the end boundaries of each individual friction material element, complete the structure.

In this novel mechanism, various novel combinations and novel elements will be claimed, hereinafter, in the claims after they have been described in their relationship to each other, with the aid of the drawings, to enable one skilled in the art to recognize the novel features from the old and well known.

In the accompanying drawings,

Fig. 1 is a top view of the assembly device;

Fig. 2 is a section on line 2—2 of Fig. 1;

Fig. 3 is a top view of preliminary stage of assembly, without the flexible constraining band;

Fig. 4 is a plan view of a pair of brake shoes and friction material elements assembled within the flexible constraining band, ready for placement in an oven to cure the adhesive;

Figs. 5 and 6 are perspective views of the segment locating jigs;

Fig. 7 is a partial side view of Fig. 3;

Fig. 8 is an enlarged section of the torque limiting device, and

Fig. 9 is a perspective view of a single friction material member, with demarcations to break it into segments.

Similar characters of reference indicate corresponding parts throughout the various views.

Referring to Figures 1 and 2, the assembly device of the present invention consists of a base plate 10 preferably of circular form having a central preferably circular, cut-out portion 11. Supporting legs 12 and radial guide slots 13 and 14 are provided. Forked jaws 15 and 16 fit into the guide slots 13 and 14 and are free to slide towards or away from the central portion 11, in that the jaws 15 and 16 have portions 17 and 18 which extend below the under side of the plate 10, said portions having threaded holes engaging the male threaded portions 21 and 22 of a screw shaft 20. Threaded portion 22 has right hand threads, mating with the right hand female threads of jaw 16. Threaded portion 21 has left hand threads, mating with the left hand female threads of jaw 15. Jaws 15 and 16 also have slots 15a and 16a in their upper protruding portions forming forks. To the base plate 10 is also attached a positioning bracket 23 by means of screws 24 which serves to position the screw shaft 20 with respect to the plate, said bracket fitting between the collar 25 attached to the screw shaft 20 by means of set screw 26 and the flange 30 which is keyed at 27 to the screw shaft 20. Hub 31 is a free fit over the screw shaft 20 and is held in contact with the flange 30 by means of a compression spring 32, nut 33 and washer 34. Hub 31 is equipped with arms 35 which terminate in ball ends 36 constituting hand wheel 37. The nut 33 engages screw threads 28 of the shaft 20.

In assembling brake shoes and friction material elements preparatory to bonding, the primary and secondary shoes 47 and 48 of a single brake are placed on the base plate 10 as shown in Fig. 3 in the approximate position they assume when assembled in the actual brake assembly assuming rotation of the brake drum to be as shown by the arrow R. Since the brake shoe is normally quite weak with regard to bending at its central portion, adaptors 38 and 39 are employed which fit between the webs of the shoes and the expanding jaws 15 and 16 to distribute the load. The friction material elements 41, 42, 43, 44, 45 and 46 after having been treated with suitable adhesive agent are placed in position on the exterior arcuate surfaces of the brake shoes and a flexible steel constraining band 40 (Fig. 4) is placed to encircle the shoes and friction material elements. The constraining band 40 has a circumferential length somewhat longer than the circumferential length of the brake shoes so that the band readily fits over and encloses the brake shoes and friction material elements. The hand wheel 37 is then rotated clockwise to expand the jaws 15 and 16 radially outward in the guide slots 13 and 14 against the adaptor plates 38 and 39 forcing the shoes 47 and 48 against the constraining band 40 and creating a compressive force between the friction material elements and brake shoes of an intensity dependent upon the torque applied to rotate the hand wheel 37. Rotation of the hand wheel 37 is continued until the torque limiting device incorporated in the hub of hand wheel 37 and described later in this text, operates to prevent further rotation of the flange 30 and screw 20. While the parts are under this force, a screw jack 49 is then employed to hold the same expanding force set up by the jaws 15 and 16. The ends 50 and 51 of the jack 49 are inserted into slots 15a and 16a in the top of the jaws 15 and 16, the jack expanded by rotating the knurled nut 52 which acts on the screw threads 53 until all slack is taken up. The jaws 15 and 16 are then retracted by counterclockwise rotation of the hand wheel 37 releasing the assembly of brake shoes, with the friction material elements held in place on the surface of the shoes by the constraining band and screw jack, as shown in Fig. 4. The assembly of brake shoes, friction material elements, constraining band adapters and screw jack is then ready for placement in an oven, or otherwise, to cure the adhesive.

After the cure of the adhesive is complete, the improved assembly device may also be used for disassembly of the brake shoes from within the constraining band. The process described above is repeated in reverse. The assembly of shoes, friction material elements, constraining band, and screw jack is placed on the base plate 10 with the jaws 15 and 16 in the retracted position. The jaws 15 and 16 are expanded against the brake shoes by clockwise rotation of the hand wheel 37 to maximum torque permitted by the torque limiting device, the screw jack unscrewed and removed, the jaws 15 and 16 retracted by counterclockwise rotation of the hand wheel 37 and the brake shoes 47 and 48 removed from within the constraining band 40 with the friction material elements bonded in place.

One of the chief drawbacks of the screw type jacking device of the previous art has been that the threaded portions of the device remained with the shoes and constraining band during the cure of the adhesive, as an integral part of the assembly, and were continually subjected to the heat used to cure the adhesive. Temperatures in the range of 325° F. to 375° F. are employed in the cure and all parts of the assembly, including the threaded portions of the screw device are subjected to this temperature for the usual period of 30 minutes.

This time-temperature cycle is sufficient to burn off any lubricant applied to the screw threads and it has thus been virtually impossible to keep the threads of such a clamping device from galling due to the lack of lubrication as it was tightened or loosened against the stress imposed by the constraining band.

In the assembly device of the present invention the screw and jaw nuts employed to create the controlled pressure between the brake shoes and their friction material elements, remain as part of the assembly device and are never subjected to heat. The pressure established by the screw and jaw nuts is taken over by the substituted screw jack that now does nothing more than hold the pressure already established by the device; and in disassembly, the load is again taken up by the preliminary assembly device. The substituted screw jack which is subjected to heat, need not be lubricated since it never operates under load; and the threads of the assembly device, which do operate under load, can be kept lubricated since they are never subjected to heat.

If instead of a single member, a plurality of individual friction material elements are to be bonded to each of the brake shoes, a pair of jigs, shown in Figures 5 and 6, are employed as shown in Figs. 3 and 7. Jig 60 is for use with the primary shoe 47 and has locating pins 61, 62, 63, 64, 65 and 66 spaced to receive the individual primary shoe friction material elements 41, 42 and 43. Jig 67 is for use with the secondary shoe 48 and has locating pins 68, 69, 70, 71, 72 and 73 spaced to receive the individual secondary friction material shoe elements 44, 45 and 46. It is usually desirable that the arcuate length of the individual friction material elements, and their position with respect to each brake shoe, be different on the primary and secondary shoes of a single brake. Thus the primary shoe 47 will generally require shorter individual elements 41, 42 and 43 which extend over less of the shoe arc and have greater intervening spaces, and the secondary shoe 48 will require longer individual elements 44, 45 and 46 which extend over more of the shoe arc and have lesser intervening spaces. In operating the clamping device with brake shoes which are to have a plurality of individual friction material elements bonded to them, the locating jigs 60 and 67 are placed on the base plate 10, as shown in Fig. 3. The primary brake shoe 47 is placed on the locating jig 60 with the reference hole 47a in brake shoe 47 over the pin 60a and with the pins 61, 62, 63, 64, 65 and 66 tangent to the surface of the shoe 47. The secondary brake shoe 48 is placed on the locating jig 67 with the reference hole 48a in brake shoe 48 over the pin 67a and with the pins 68, 69, 70, 71, 72 and 73 tangent to the surface of the shoe 48. The friction material elements 41, 42 and 43 which have been cut to primary shoe lengths as specified, are treated with the adhesive agent selected and then placed against the surface of the primary brake shoe 47 between the proper pair of locating pins 61, 62, 63, 64, 65 and 66. The friction material elements 44, 45 and 46 which have been cut to secondary shoe lengths as specified are likewise treated with the adhesive agent selected and placed against the surface of the secondary brake shoe 48 between the proper pair of locating pins 68, 69, 70, 71, 72 and 73. In this way, the various individual friction material elements employed are properly positioned with respect to each brake shoe and with respect to each other with the proper intervening spaces between each individual element. For this purpose, the segments are correspondingly numbered to facilitate the work of assembling.

In Fig. 9 is shown a continuous lining member which may be broken off into individual short segments and showing the numbering. This is the preferred form of the use to carry out this invention, said preferred form forming the basis of an application for Letters Patent filed on even date herewith by Sydney G. Tilden, Jr., under Serial No. 229,842.

After positioning the friction material elements as described above, the shoes and elements are encircled by a constraining band and are expanded against the band by rotation of the hand wheel exactly as heretofore described. The jigs 60 and 67 are free to slide on the assembly plate 10 with the brake shoes 47 and 48 as they are forced radially outward by the forked jaws 15 and 16. The locating pins 61, 62, 63, 64, 65, 66, and 68, 69, 70, 71, 72 and 73, being of a diameter less than the thickness of the friction material 41 to 46 inclusive, do not interefere with the action of the constraining band 40 in holding the elements to the shoes. After expansion of the shoes into the constraining band to the pressure established by the torque limiting device hereafter described, the screw jack 49 is used to take up the force of the jaws, the jaws retracted and the assembled shoes, band and jack, with the jigs 60 and 67 still in place, are removed from the base plate. The jigs 60 and 67 can then be slipped off the shoes and used to assemble similar friction material elements on another similar pair of shoes.

The construction of the torque limiting means employed in the preliminary assembly device is shown in more detail in Figure 8 and consists of two steel bearing balls 74 and 75, interposed between the flange 30 and the hub 31. The bearing balls 74 and 75 fit into two recesses 76 and 77 in the face of the flange 30 and only partially project into two mating conical depressions 78 and 79 in the face of the hub 31. The face of the hub 31 is held against the face of the flange 30 by the compression spring 32, the compression force of which is adjustable by the nut 33 which engages the screw threads 28 of the screw shaft 20. The two recesses 76 and 77 and the two depressions 78 and 79 lie along circles of equal diameter on the face of the flange 30 and the hub 31 concentric with their centers and are spaced along the circumference of said circles 180° apart, so that, as the hub 31 is rotated each 180° with respect to the flange 30, the recesses 76 and 77 and the depressions 78 and 79 will line up with each other and the bearing balls 74 and 75 in the recesses 76 and 77 will partially project into the depressions 78 and 79. The outer diameter of the spring 32 and the outer diameter of the washer 34, are each smaller than the inner diameter of a bore 80 in the hub 31; and a webbed portion 81 of the hub 31 has a bore 82 with a free sliding movement with the outer surface 83 of the shaft 20.

The operation of the torque limiting device is as follows: When the hub 31 is rotated by a manual force exerted on the arms 35 and the ball ends 36 (not shown in Fig. 8), the torque applied to the hub 31 is transferred to the flange 30 through the balls 74 and 75. So long as the face of the hub 31 is held in planar contact with the face of the flange 30 by the action of the spring 32, the balls 74 and 75 cannot climb out of the conical depressions 78 and 79. However, when the torque applied to the hub 31 is of sufficient magnitude, the hub 31 will be forced axially from the flange 30 against the action of the spring 32 by the action of steel bearing balls 74 and 75 as they climb out of conical depressions 78 and 79. When this takes place, the bearing balls 74 and 75 can no longer transmit torque from the hub 31 to the flange 30. Further continued rotation of the hub 31 will only cause repeated axial separation of the hub 31 and flange 30 as the balls 74 and 75 alternately climb out of the recesses 78 and 79 and drop into the opposite recesses 180° disposed and will not result in any greater torque being applied to the screw shaft 20. The diameter of the bearing balls 74 and 75, the angle of the walls of the conical enclosures 78 and 79, their distance from the axis of the screw 20, the compression force of the spring 32 and the pitch of the screw threads 21 and 22 must be co-related in order to result in a torque limitation of the desired amount and it has been found that with $\frac{1}{4}''$ diameter bearing balls, an included angle of the walls of the conical enclosures 78 and 79 of 118° at a distance of $1\frac{1}{4}''$, from the screw axis with a compression spring 32 which compresses $\frac{1}{16}''$ for a 500 lbs. load and 10 pitch threads 21 and 22 on the screw shaft 20, will result in a force of 1200 lbs. acting to separate the jaws 15 and 16, which is approximately the force desired for optimum bond strength with the particular adhesive agent preferred. While two bearing balls 74 and 75 in two recesses 76 and 77 acting on two conical depressions 78 and 79, are employed in the improved torque limiting device described, it is understood that the number of balls, recesses and depressions employed is immaterial to the theory of the device, and a further plurality of balls, recesses and depressions serves only to further balance the forces involved and distribute the load.

With the clamping device of the present invention, both assembly and dis-assembly of the shoes is speeded up saving valuable time and reducing labor costs. The compressive pressure set up between the friction material elements and the brake shoe surfaces is pre-determined and controlled, and the location of a plurality of individual friction material elements with respect to the brake shoe and with respect to each other, is accurately established.

I do not wish to be limited to the details of the embodiment described or to the details of the manner of making the same, since changes may occur to one skilled in the art, without departing from the invention as defined by the claims appended hereto.

I claim:

1. In a device for clamping friction material elements onto brake shoes of automotive vehicles, the combination of a base plate having aligned guide slots therein, a pair of oppositely disposed and aligned jaws having right-hand and left-hand female threads respectively, said jaws being slidably operable in said slots of said base plate, double ended screw means for sliding said jaws toward and away from each other, said screw means being provided with right-hand and left-hand male threads engaging said right-hand and left-hand female threads in said jaws, a hub secured to one end of said screw means, said hub having a plurality of recesses in one of its walls, a hand-operated rotatably mounted member abutting said recesses-containing wall of said hub, said member having a plurality of recesses registering with said recesses in said wall of said hub, adjustable means urging said member toward said hub, a plurality of torque transmitting elements in said recesses between said hub and said hand operated member, and an annular elastic member adapted to surround a pair of brake shoes provided with an adhesive friction lining, whereby, when such pair of brake shoes provided with an adhesive friction lining on their exterior surfaces is placed onto said base plate, and said hand operated member is rotated in one direction, said jaws engage a web of each of said brake shoes and force the exterior surfaces of said brake shoes carrying said adhesive friction lining toward said annular elastic member until said torque transmitting elements remain in said recesses, and when said hand operated member is rotated in the opposite direction, said jaws disengage said webs of said brake shoes to permit removal of said brake shoes from said base plate.

2. In a device for clamping friction material elements onto brake shoes of automotive vehicles, the combination of a base plate having aligned guide slots therein, a pair of oppositely disposed and aligned jaws having right-hand and left-hand female threads respectively, said jaws being slidably operable in said slots of said base plate, double ended screw means for sliding said jaws toward and away from each other, said screw means being provided with right-hand and left-hand male threads engaging said right-hand and left-hand female threads in said jaws, a hub secured to one end of said screw means, said hub having a plurality of recesses in one of its walls, a hand operated rotatably mounted member abutting said recesses-containing wall of said hub, said member having a plurality of recesses registering with said recesses in said wall of said hub, adjustable means urging said rotatable member toward said hub, a plurality of torque transmitting elements in said recesses between said hub and said hand operated member, an annular member adapted to surround a pair of brake shoes provided with an adhesive friction lining, and a screw jack adapted to retain a pair of brake shoes provided with an adhesive lining of friction material on their exterior surfaces in spaced relationship within said annular band, whereby, when such pair of brake shoes provided with an adhesive friction lining on their exterior surfaces and surrounded by said annular band is placed onto said base plate, and said hand operated member is rotated in one direction, said jaws engage a web of each of said brake shoes and force the exterior surfaces of said brake shoes carrying said adhesive friction lining against said annular member until said torque transmitting elements remain in said recesses, said screw jack prevents said brake shoes from displacement with respect to said annular band when said hand operated member is operated in the opposite direction and said jaws disengage the webs of said brake shoes to permit the removal of said brake shoes from said base plate, while said brake shoes are spaced apart by said screw jack within said annular member.

3. In a device for clamping segmental friction material elements onto brake shoes of automotive vehicles, the combination of a base plate having aligned guide slots therein, a pair of oppositely disposed and aligned jaws having right-hand and left-hand female threads respectively, said jaws being slidably operable in said slots of said base plate, double ended screw means for sliding said jaws toward and away from each other, said screw means being provided with right-hand and left-hand male threads engaging said right-hand and left-hand female threads in said jaws, a hub secured to one end of said screw means, said hub having a plurality of recesses in one of its walls, a hand operated rotatably mounted member abutting said recesses-containing wall of said hub, said member having a plurality of recesses registering with said recesses in said wall of said hub, adjustable means urging said member toward said hub, a plurality of torque transmitting elements in said registering recesses between said hub and said hand operated member, an annular member adapted to surround a pair of brake shoes provided with an adhesive segmental friction lining, a screw jack adapted to retain a pair of brake shoes provided with an adhesive lining on their exterior surfaces in spaced relationship within said annular member, a pair of arcuate locator plates each disposed between a brake shoe and said base plate, each of said locator plates being removably and pivotally connected to a brake shoe by a locator pin insertable in a reference opening provided in each brake shoe, and a plurality of spaced guide pins on said locator plates, said guide pins having a diameter less than the thickness of the friction material segments and being disposed on said locator plates along the arc of a circle substantially of the same radius as the radius of the exterior surfaces of the brake shoes, whereby, when a pair of brake shoes with an adhesive segmental friction lining is placed onto said locator plates on said base plate and surrounded by said annular member, said guide pins on said locator plates retain each segment of the adhesive friction lining in its proper position on the exterior surfaces of said brake shoes prior to and during the expanding action of said jaws to move the brake shoes with their exterior surfaces carrying properly arranged segments of the friction lining toward said annular band surrounding said brake shoes and to insert said screw jack between said spaced brake shoes.

References Cited in the file of this patent
UNITED STATES PATENTS

| Number | Name | Date |
|---|---|---|
| 348,299 | Stehman | Aug. 31, 1886 |
| 1,020,139 | Furrer | Mar. 12, 1912 |
| 1,883,164 | Vassakos | Oct. 18, 1932 |
| 2,358,483 | Tilden | Sept. 19, 1944 |
| 2,498,937 | Barrett | Feb. 28, 1950 |
| 2,523,507 | Langford et al. | Sept. 26, 1950 |